(12) United States Patent
Simon

(10) Patent No.: US 6,459,452 B1
(45) Date of Patent: Oct. 1, 2002

(54) SYSTEM, METHOD, AND APPARATUS FOR DECODING DIGITAL VIDEO SEQUENCES

(75) Inventor: Allen H. Simon, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/541,049

(22) Filed: Mar. 31, 2000

(51) Int. Cl.[7] ................................................ H04N 7/18
(52) U.S. Cl. ............... 348/416; 375/240.16; 375/240.21
(58) Field of Search ........... 375/240.21, 241.11–240.18

(56) References Cited

U.S. PATENT DOCUMENTS

| | | | | |
|---|---|---|---|---|
| 5,644,361 A | * | 7/1997 | Ran et al. ............... | 375/240.16 |
| 5,818,530 A | * | 10/1998 | Canfield et al. .......... | 348/400.1 |
| 5,920,353 A | * | 7/1999 | Diaz et al. .............. | 375/240.15 |
| 6,028,635 A | * | 2/2000 | Owen et al. ................. | 348/699 |
| 6,184,935 B1 | * | 2/2001 | Iaquinto et al. ............. | 348/441 |
| 6,256,347 B1 | * | 7/2001 | Yu et al. ................. | 375/240.13 |

* cited by examiner

*Primary Examiner*—Andy Rao
(74) *Attorney, Agent, or Firm*—Pillsbury Winthrop LLP

(57) ABSTRACT

A system, method, and apparatus are disclosed that support decoding of motion-compensation-encoded digital video sequences while having reduced storage requirements.

37 Claims, 14 Drawing Sheets

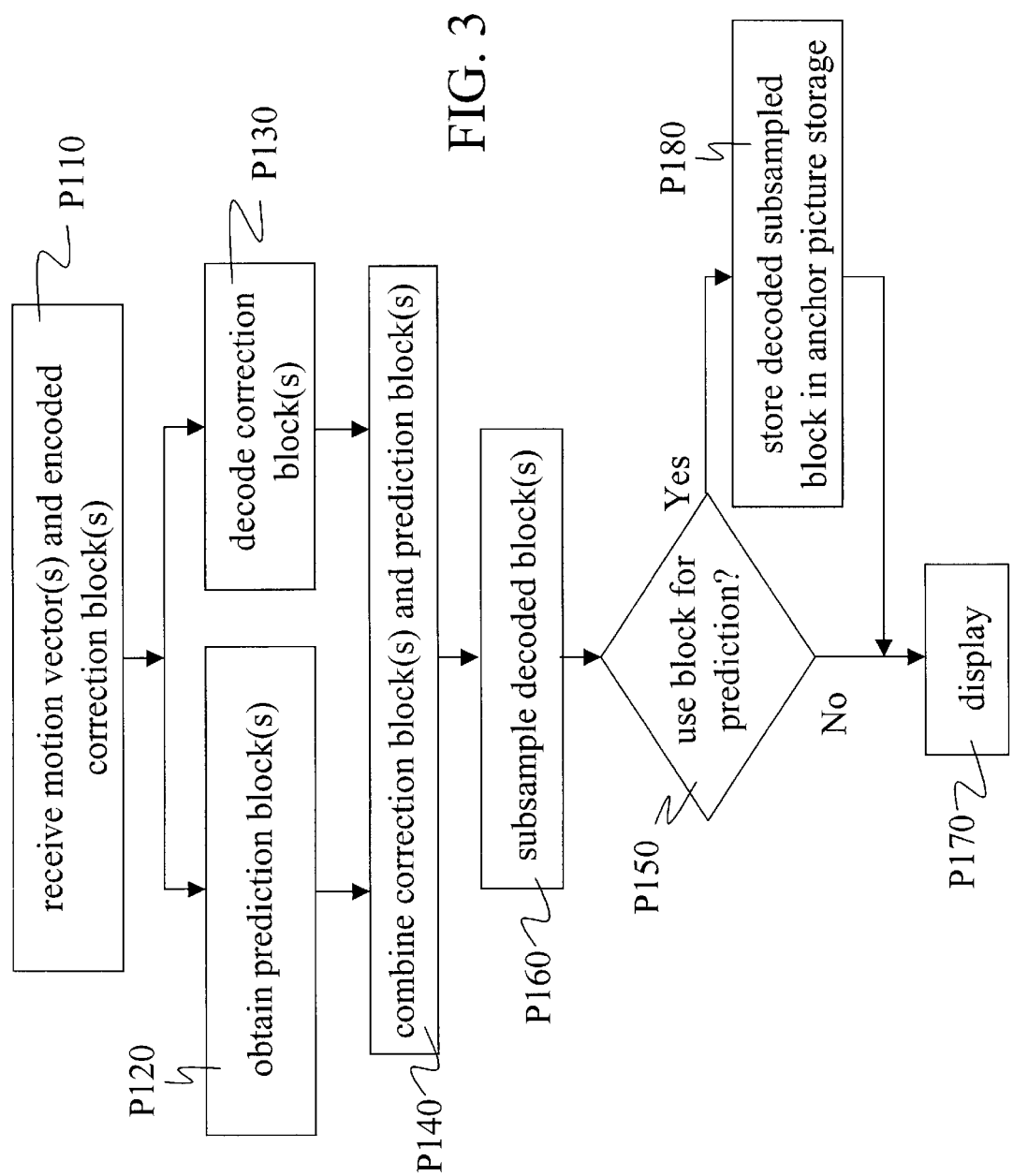

SYSTEM, METHOD, AND APPARATUS FOR DECODING DIGITAL VIDEO SEQUENCES

RELATED APPLICATIONS

This application is a continuation-in-part application of "METHOD AND APPARATUS FOR PERFORMING VIDEO IMAGE DECODING" by the inventors Hong H. Jiang, Allen H. Simon, and Val G. Cook, filed Dec. 20, 1999 and bearing attorney docket number 042390.P5700.

BACKGROUND OF THE INVENTION

1. Field of the Invention

This invention relates to the transfer and storage of digital images. Specifically, this invention relates to decoding digital video sequences that have been encoded using motion compensation.

2. Description of Related Art and General Background

Several popular methods of encoding digital video sequences use motion compensation to exploit redundancy between images in a sequence. These methods include discrete-cosine-transform (DCT)-based schemes such as the H.261 and H.263 videoconferencing standards as well as the various MPEG standards (e.g. MPEG-1, MPEG-2 and MPEG-4, as published by the International Organization for Standardization, Geneva, Switzerland).

In a motion-compensated encoding scheme, the picture space is sampled and divided into nonoverlapping areas (see, e.g., FIG. 1A, wherein the sample points (or pixels) are represented by open circles, and boundaries between 16×16-pixel areas are represented by dotted lines). A picture in a video sequence may be encoded as a single frame, such that the rows of pixels in the picture are scanned progressively (e.g. from top to bottom). Alternatively, a picture may be encoded as two or more interlaced fields, such that progressive scanning of each field is completed before scanning of the next field begins (see, e.g., FIG. 1B, wherein pixels in each of the two fields are represented by open and filled circles, respectively).

A bitstream for transfer or storage of a motion-compensated video sequence comprises motion vectors and encoded correction blocks and may also include data relating to such features as picture size. In a scheme compliant with the MPEG-2 standard (ISO/IEC 13818-2), for example (see FIG. 2A), each 16×16-pixel picture area is encoded in part as a macroblock which comprises four 8×8-sample luma (Y) correction blocks and two, four, or eight 8×8-sample chroma correction blocks (i.e. one, two, or four Cb blocks, and the same number of Cr blocks). While a macroblock corresponds to a 16×16-pixel area in the picture space, note that the sampling grid for each particular sample space (e.g. Y, Cr, and Cb) may not correspond to that of the picture space or to that of another sample space.

Some of the pictures in an encoded video sequence may be unpredicted, such that the correction blocks within a macroblock contain all of the information necessary to decode a corresponding picture area without reference to a motion vector. For other pictures in the sequence (or 'predicted pictures'), some areas may be encoded using motion vectors that refer to portions of one or more previously decoded pictures.

A motion vector indicates a translational offset in the picture space from the position of the picture area being decoded. Such a vector accompanies a macroblock and defines the positions of prediction blocks that correspond to the correction blocks (see, e.g., FIG. 2B). Values for the samples in a prediction block are obtained from values at corresponding sample space locations (or are interpolated from values at nearby sample space locations) in previously decoded pictures. In order to support decoding of a motion-compensation-encoded video sequence, therefore, it is necessary for information from previously decoded pictures to be available.

Compliance with the MPEG-2 standard requires a decoder to store two decoded pictures (herein called 'anchor pictures') in memory at a time. Buffer space should also be provided for the picture being decoded, and it may be desirable to provide additional space for the picture being displayed. Thus many decoding schemes require storage space sufficient to hold up to four decoded pictures.

One important use for video encoding methods is to support delivery of digital HDTV (High Definition Television) signals. In an exemplary HDTV image sequence, each picture measures 1920×1080 pixels, with color and intensity information for each decoded pixel being represented by an average of 12 bits (e.g. 8 bits/pixel for the luma information and an average of 4 bits/pixel for the chroma information). Therefore, some three megabytes of memory are required in order to store a single picture. Maintaining compliance with a particular encoding scheme may require storage of several pictures at once, and support for multiple image features such as picture-in-picture (PIP) may increase storage requirements even further. In addition to the physical costs (e.g. of materials, fabrication, and board area consumption) that are associated with these storage requirements, implementational costs such as support for high-bandwidth memory accesses are also incurred. It is therefore desirable to obtain a system, method, and apparatus that support decoding of motion-compensation-encoded digital video sequences and have reduced storage requirements.

BRIEF DESCRIPTION OF THE DRAWINGS

FIG. 3 shows a flow chart for a method according to an embodiment of the invention.

DETAILED DESCRIPTION OF THE INVENTION

Figure 1A:
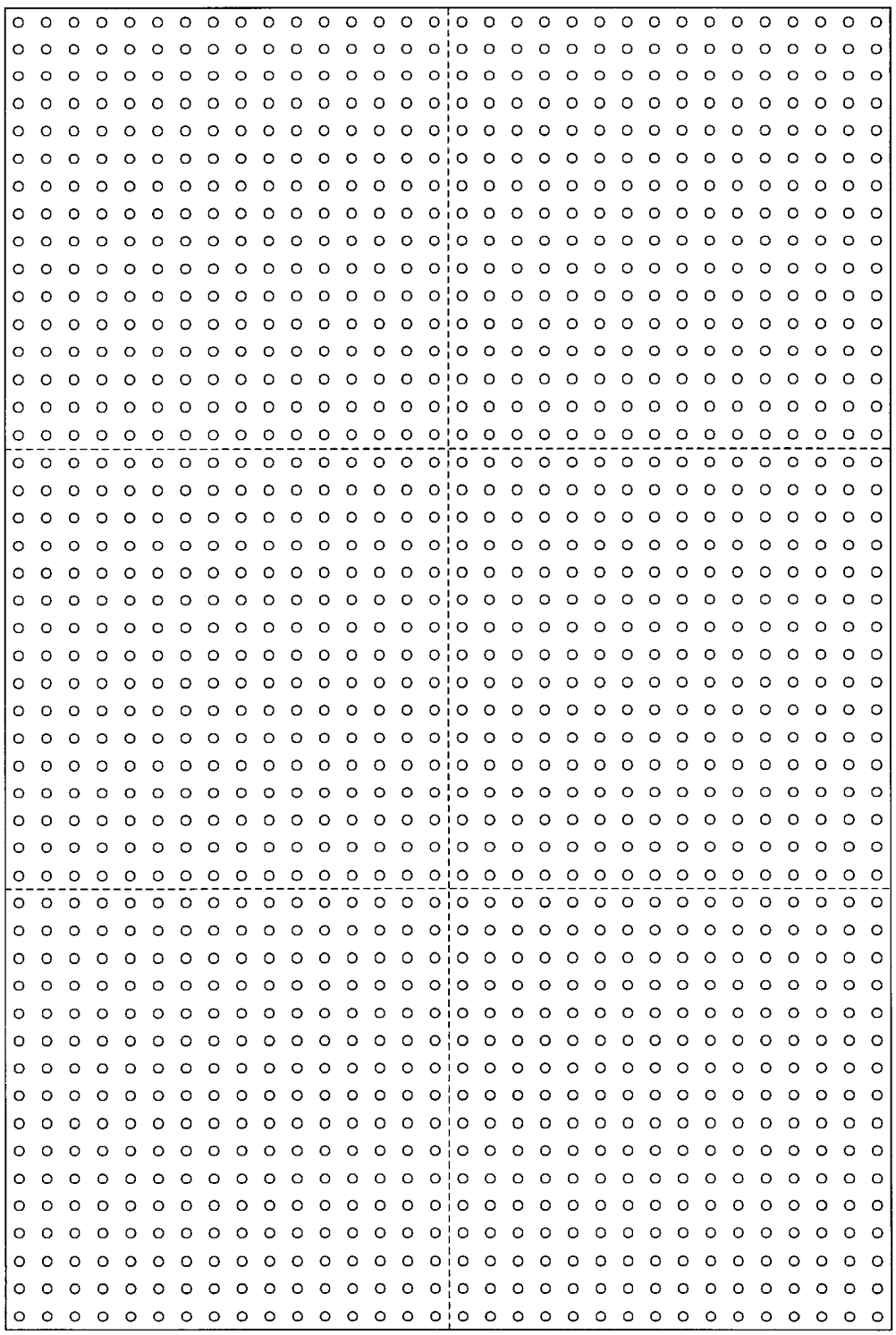
FIG. 1A shows an example of a picture divided into nonoverlapping areas of 16×16 pixels and encoded as a single frame.

FIG. 3 shows a flow chart for a method according to an embodiment of the invention. In event P110, one or more motion vectors and one or more encoded correction blocks are received. For example, this information may be received as part of a bitstream compliant with one of the standards referenced above or a related motion-compensation encoding scheme.

In task P120, the motion vector(s) are applied to retrieve anchor picture information which is remapped as necessary to a predetermined sampling grid to produce one or more prediction blocks. In task P130, the encoded correction block(s) are also decoded to the predetermined sampling grid. The prediction and decoded correction blocks are combined in task P140 to produce a decoded sample block which is subsampled in task P160 and possibly stored in task P180.

It may be desired to use information from the decoded subsampled block in decoding one or more other sample blocks. In some cases, the decision to store decoded sample blocks is made on a picture-by-picture basis. In an MPEG-2 compliant system, for example, decoded sample blocks are stored for intra-coded (I) pictures and predictive-coded (P) pictures, but not for bidirectionally predictive-coded (B) pictures. In another system, the decision to store information from a decoded sample block may be made on a macroblock-by-macroblock or a block-by-block basis (as in task P150). If the decoded subsampled block is to be stored, then in task P180 it is stored to the anchor picture storage. The decoded subsampled block may also be combined with other decoded subsampled blocks (e.g. via a YCbCr to RGB mapping) to produce a decoded picture area for display, as indicated by event P170.

In a general but non-limiting implementation of the method of FIG. 3, the number of samples in a decoded correction block is the same as the number of samples in an encoded correction block (i.e. no subsampling occurs in task P130). A correction block decoded in task P130 may have been encoded using a scheme such as any of the various known run-length or variable-length encoding methods, which scheme may be either lossy or lossless. Alternatively, the correction block may have been encoded as a set of coefficients in a nonspatial domain (e.g. a Fourier, wavelet, or DCT domain). For DCT-encoded information, the following expression (from Annex A of the MPEG-2 standard) may be used in task P130 to perform an inverse DCT on a block of N×N transform coefficients to obtain an N×N-sample block:

$$f(x,y) = \frac{2}{N}\sum_{u=0}^{N-1}\sum_{v=0}^{N-1} C(u)C(v)F(u,v)\cos\frac{(2x+1)u\pi}{2N}\cos\frac{(2y+1)y\pi}{2N},$$

where f(x,y) represents the value of the sample at spatial coordinates (x,y); F(u,v) represents the value of the transform at transform coordinates (u,v); u, v, x, and y have integer values in the range from 0 to N−1; and the values of C(u) and C(v) are defined by the expression $$C(a) = \{1/\sqrt{2} \text{ for } a=0, 1 \text{ otherwise}\}.$$

In task P140, the decoded correction block(s) are combined with (e.g. added to) a prediction block as produced by task P120 to obtain a decoded sample block. The subsampling operation performed on this block in task P160 may also include an antialiasing operation such as lowpass filtering.

Blocks that correspond to interlaced picture areas may themselves be interlaced. Alternatively, each such block may contain only samples from a particular field (in MPEG-2, this format is called field DCT). Blocks of samples that correspond to the same picture area are eventually combined to generate pixels, but this operation need not be performed until the picture is displayed.

Figure 1B:
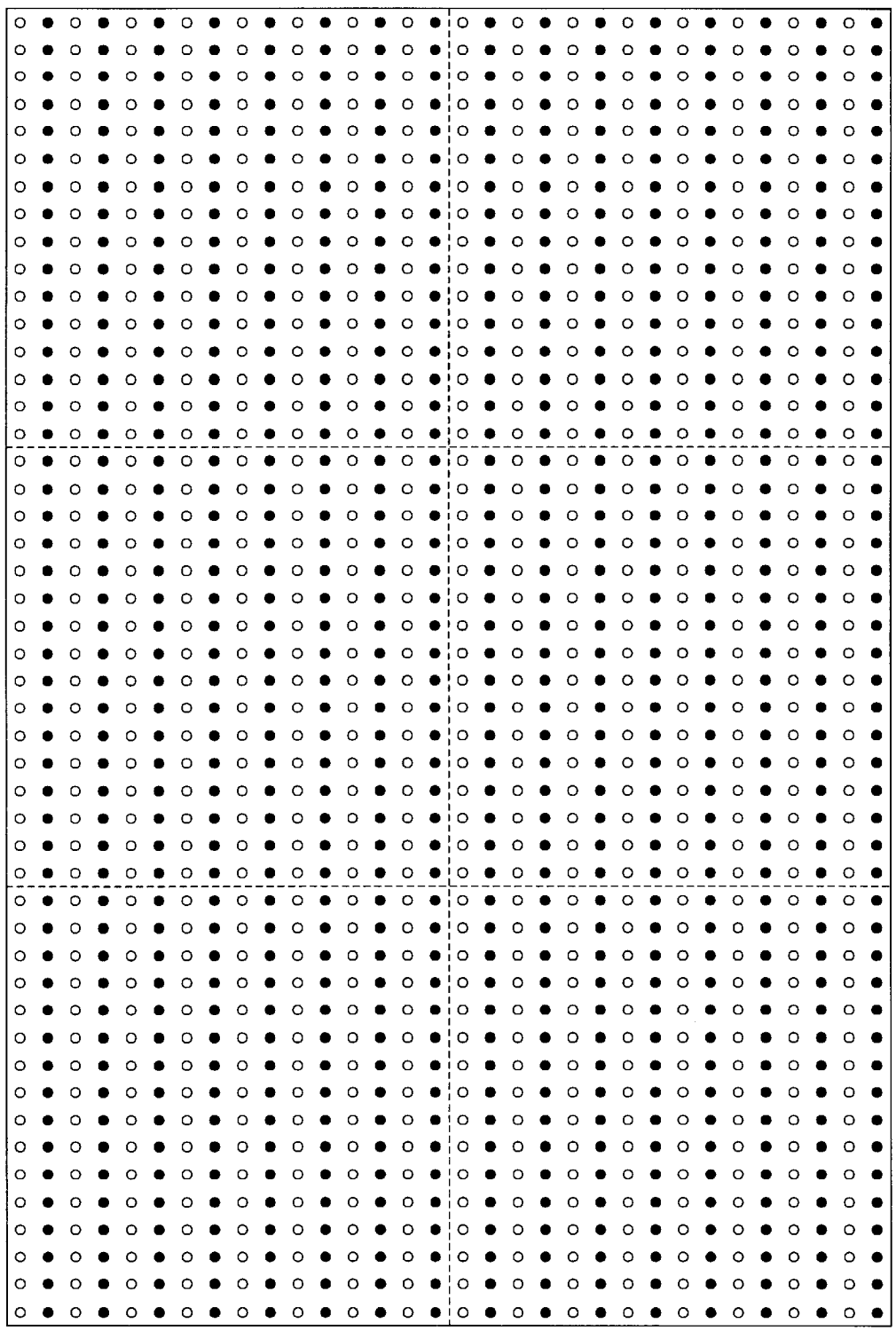
FIG. 1B shows an example of a picture divided into nonoverlapping areas of 16×16 pixels and encoded as two interlaced fields.
Figure 2A:
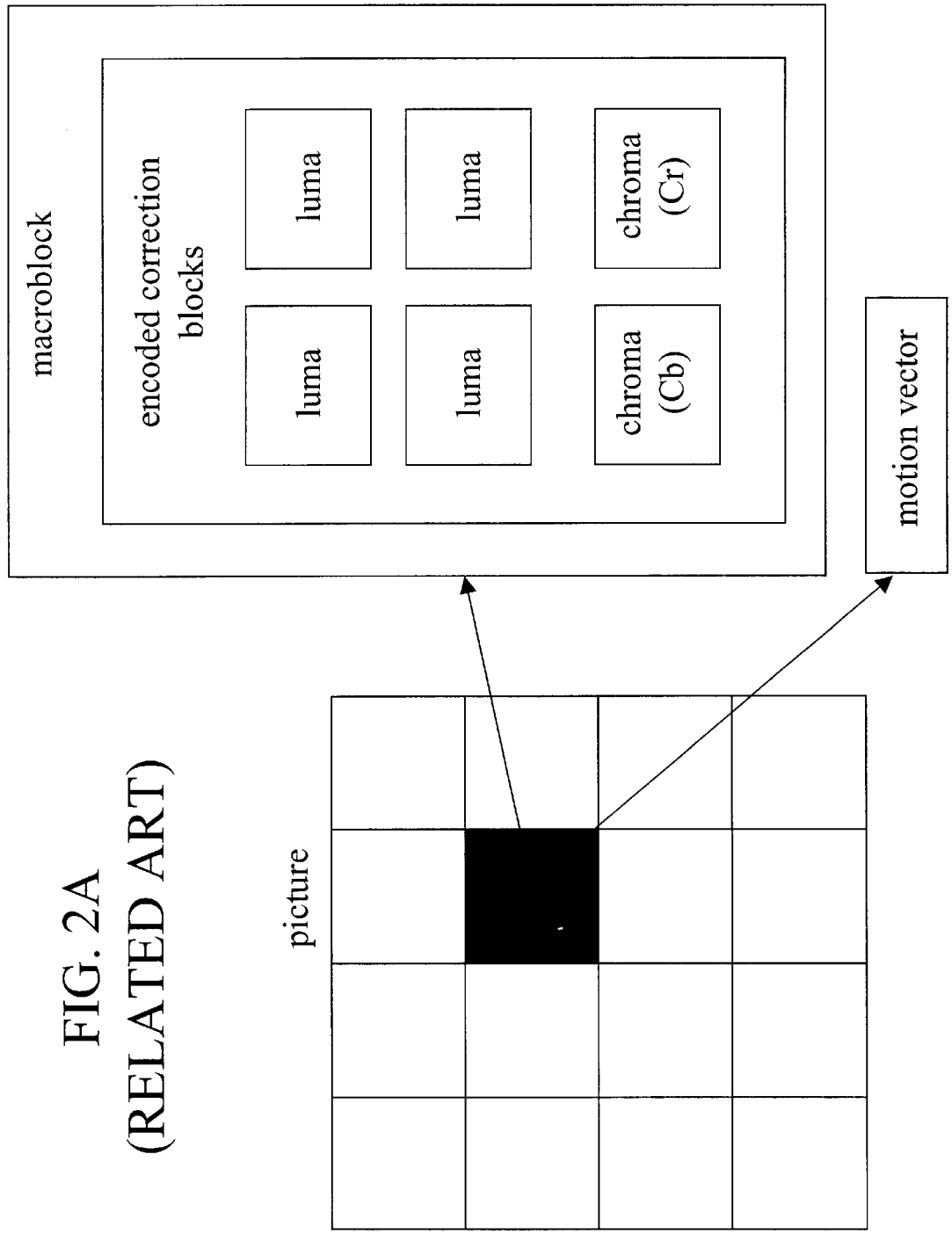
FIG. 2A illustrates an MPEG-2 compliant encoding operation.
Figure 2B:
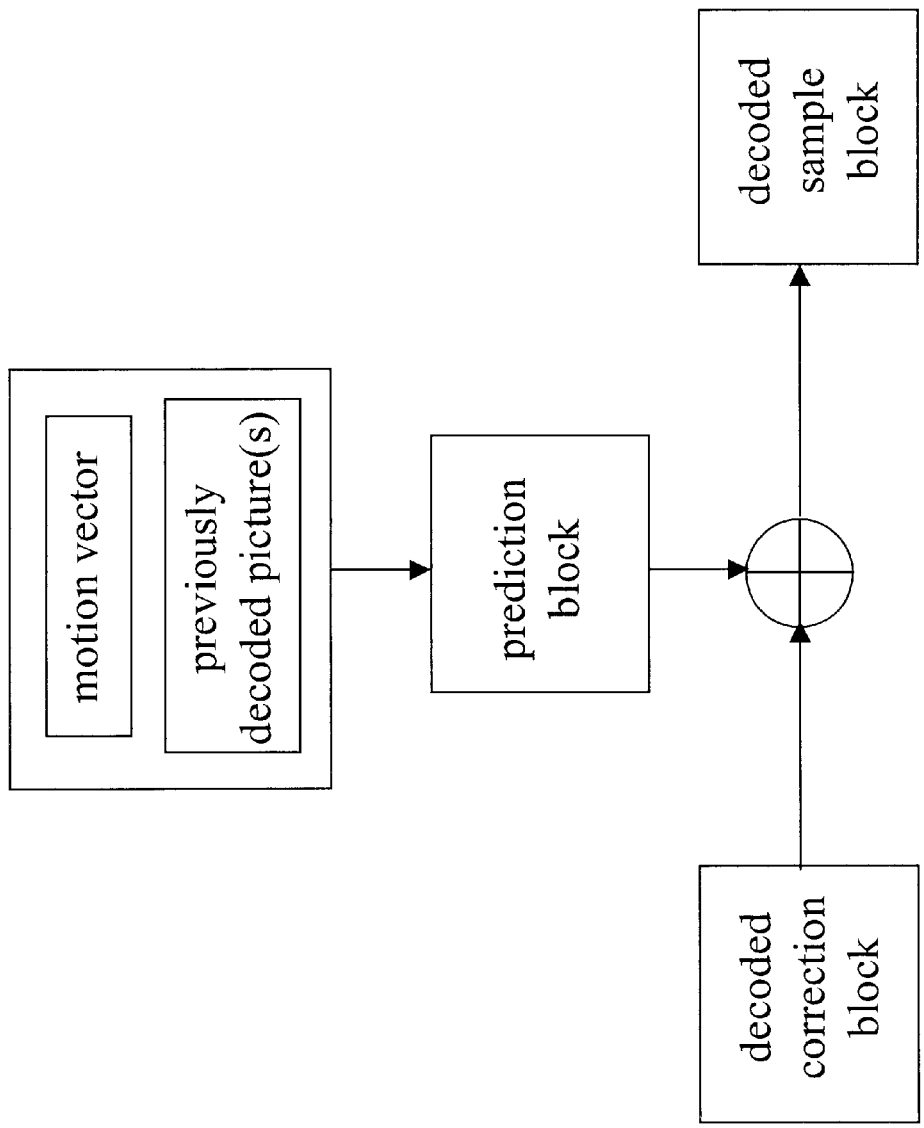
FIG. 2B illustrates a portion of a decoding operation relating to the encoding operation of FIG. 2A.
Figure 4:
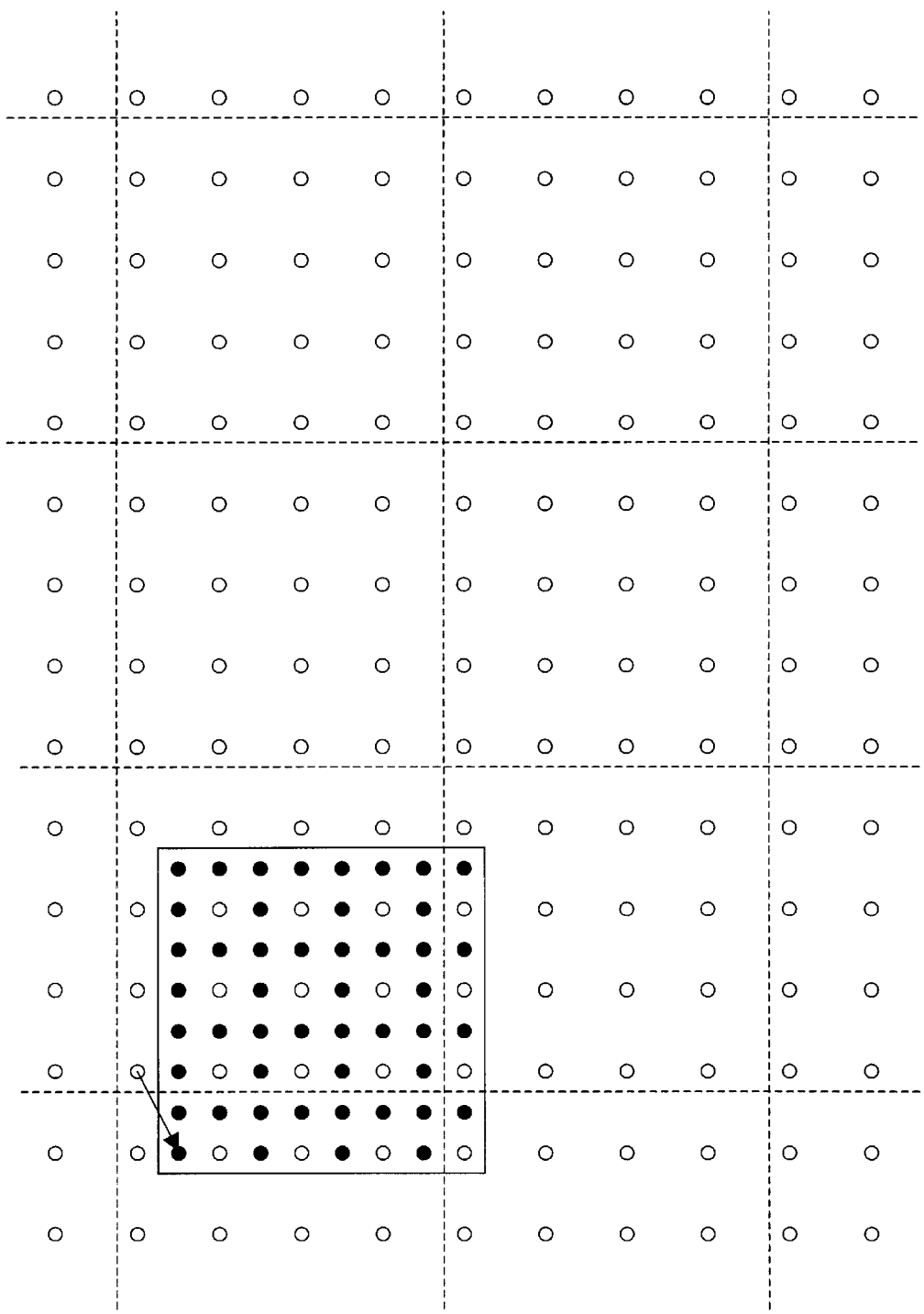
FIG. 4 shows an example of the operation of task P120 of FIG. 3.

The production of a prediction block in task P120 is explained in more detail with reference to FIG. 4. This figure relates to a particular (but non-limiting) example in which (A) an encoded correction block received in event P110 corresponds to a particular 8×8-sample block in the sample space and (B) subsampling in task P160 reduces the number of samples in each direction of a block by one-half (resulting in a 4×4-sample block). FIG. 4 illustrates the following features:

samples whose values are available in the anchor picture storage (represented by the unfilled circles and obtained, for example, from performing subsampling task P160 and storage task P180 on previously decoded blocks);

a motion vector which defines the position of the prediction block (indicated by the arrow; note that because the sampling grid of the sample space may differ from that of the picture space or another sample space, this motion vector may be a scaled and/or rotated version of the one which is received in task P110);

boundaries between the nonoverlapping blocks of the sample space (indicated by the dotted lines, where the particular encoded correction block received in event P110 corresponds to the sample space block from which the motion vector originates);

the boundaries of the prediction block (indicated by the solid-lined box); and the samples within the prediction block whose values are not directly available in the anchor picture storage (indicated by the filled circles). As shown in FIGS. 1A and 1B, the anchor picture storage may contain information encoded as a single frame and/or information encoded as two or more interlaced fields, which fields may be stored in the same region or in separate regions of the anchor picture storage. Likewise, the individual matrices (e.g. Y, Cr, and Cb) may be stored within the anchor picture storage in separate areas or in an interspersed fashion. Additionally, the spacing between samples in the anchor picture storage need not conform to the sampling grid of any sample space or be uniform in any dimension or the same among the various dimensions, although one of more of such features may be desirable in a particular application.

In the particular case illustrated in FIG. 4, the motion vector indicates that the prediction block may be found in the anchor picture storage by applying an offset (with respect to the sample space domain) of one sample down and two samples left. Because the sample values indicated by the filled circles are not directly available in the anchor picture storage, they must be derived from known or estimated values. Many different derivation schemes may be used, examples of suitable schemes including linear, polynomial (quadratic, cubic, etc.), bilinear, bicubic, biquartic, and Lagrangian interpolation. It is possible that none of the values in a prediction block will be directly available in the anchor picture storage.

In areas where information needed to support interpolation is lacking or incomplete (such as at or near the border of the stored picture), a sample value may be assigned or derived at least in part from a predetermined value or set of values. In one example, samples on the stored picture border may be copied as necessary to complete a block as indicated by a motion vector. In another example, blocks along the stored picture border may be reflected outward as necessary. Each of these approaches helps to reduce discontinuities within the prediction block.

Figure 5B:
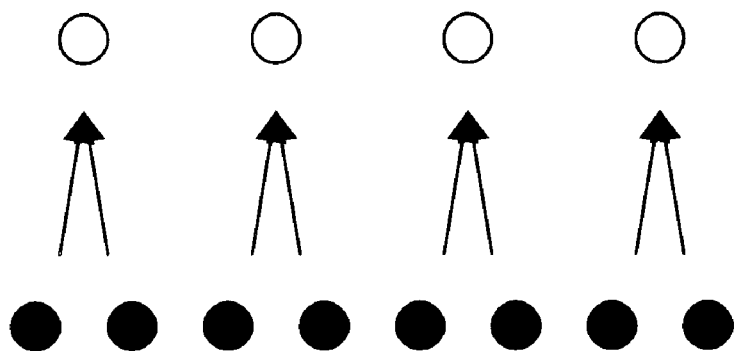
FIG. 5B shows a correspondence between a column of samples before and after the subsampling operation of FIG. 5A.
Figure 5A:
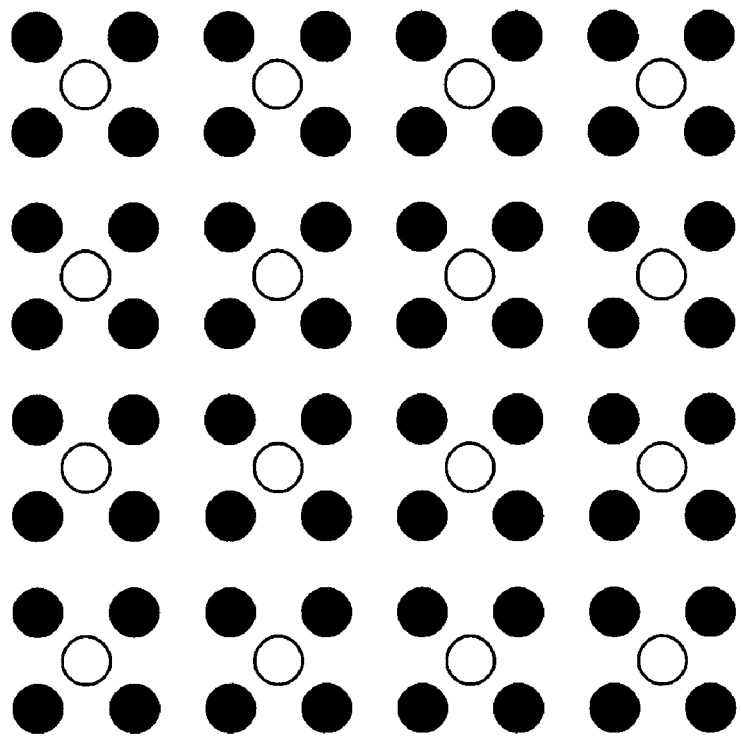
FIG. 5A shows an example of subsampling an 8×8-sample block encoded as a single frame.

Subsampling the decoded block to a predetermined subsampling grid (e.g. in task P160) before it is stored in task P180 reduces the size and bandwidth requirements for the anchor picture storage. Such subsampling may be accomplished by applying one of the derivation schemes mentioned above. Using linear interpolation, for example, a 4×4-sample block may be obtained from an 8×8-sample block by an operation equivalent to averaging each pair of columns of samples (thereby subsampling by a factor of two in the horizontal dimension) and averaging each pair of rows of samples (thereby subsampling by a factor of two in the vertical dimension). When such an operation is applied to an 8×8-sample block that is scanned progressively (filled circles), the 4×4-sample block having equal spacing between samples (open circles) is obtained as shown in FIG. 5A. FIG. 5B shows the correspondence between a column of samples before and after this subsampling operation (represented by filled circles and open circles, respectively). As mentioned above, an antialiasing operation (to remove frequency components that cannot be represented properly in the subsampled block) may be performed before or during the subsampling operation of task P160.

Figure 6B:
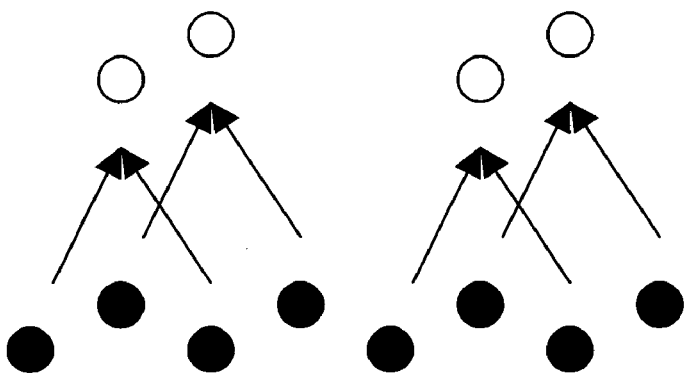
FIG. 6B shows a correspondence between a column of samples before and after the subsampling operation of FIG. 6A.
Figure 6A:
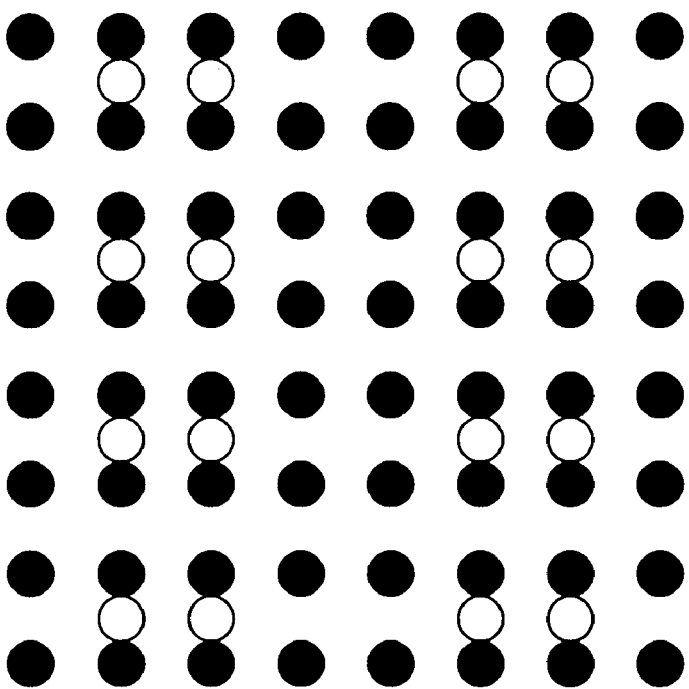
FIG. 6A shows an example of subsampling an 8×8-sample block encoded as two interlaced fields.

When a subsampling operation as described above is applied to a block that is scanned in an interlaced fashion, a different result may be obtained than the one illustrated in FIGS. 5A and 5B. FIG. 6A shows the example of applying such an operation to an 8×8-sample block that is scanned as two fields interlaced line-by-line, where each field is subsampled in succession and the resulting samples are represented by open circles. Because lines that are adjacent in time belong to the same field and therefore are alternate in the sample space, this operation has the effect of averaging alternate rows of samples instead of adjacent ones as in FIGS. 5A and 5B. FIG. 6B shows the correspondence between a column of samples before and after this operation (represented by filled circles and open circles, respectively), where the offset in time between the two fields is illustrated by a left-to-right displacement of samples corresponding to different fields. One may see that because the samples in the 4×4-sample blocks of FIGS. 5A and 6A represent different points in the sample space, a different interpolation operation would be required to produce an accurate 8×8-sample prediction block from each of these two blocks.

Because a prediction block may be derived from portions of up to four stored blocks (e.g. as shown in FIG. 4), it may be advantageous for all of the blocks in the anchor picture storage to conform to the same subsampling grid (e.g. to one of the grids depicted in FIGS. 5A and 6A). In an alternative method, the process of obtaining a prediction block from an anchor picture storage that conforms to multiple subsampling grids could be complicated by a need to choose between interpolation operations on a sample-by-sample basis.

Figure 7A:
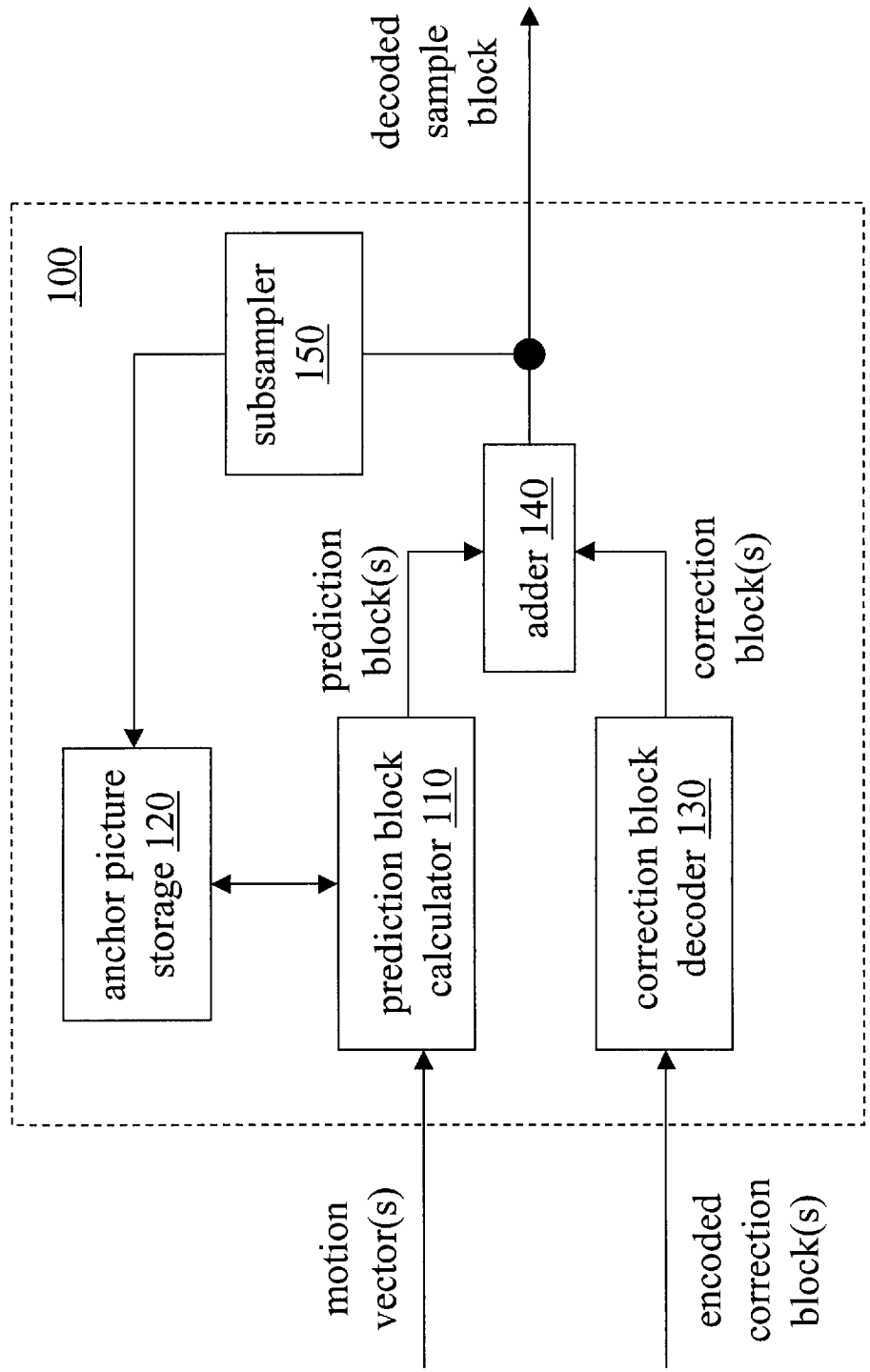
FIG. 7A shows a block diagram for an apparatus according to an embodiment of the invention.

FIG. 7A shows a block diagram for an apparatus 100 according to an embodiment of the invention. Apparatus 100 receives one or more motion vectors and one or more encoded correction blocks as described above and outputs a decoded sample block. Prediction block calculator 110 receives the motion vector(s) and produces one or more prediction blocks. Specifically, prediction block calculator 110 applies a motion vector to select a subsampled block of samples from anchor picture storage 120 and operates upon the subsampled block (e.g. as described above with respect to task P120) to produce a prediction block of samples.

Correction block decoder 130 receives and decodes the correction information to obtain one or more correction blocks of samples. Adder 140 receives the prediction and correction blocks of samples and combines them to produce the decoded sample block. The decoded sample block is outputted by apparatus 100 and may also be used (after subsampling by subsampler 150) to update at least a portion of anchor picture storage 120 (e.g. to support the derivation of a prediction block for a sample block to be decoded subsequently).

Figure 7B:
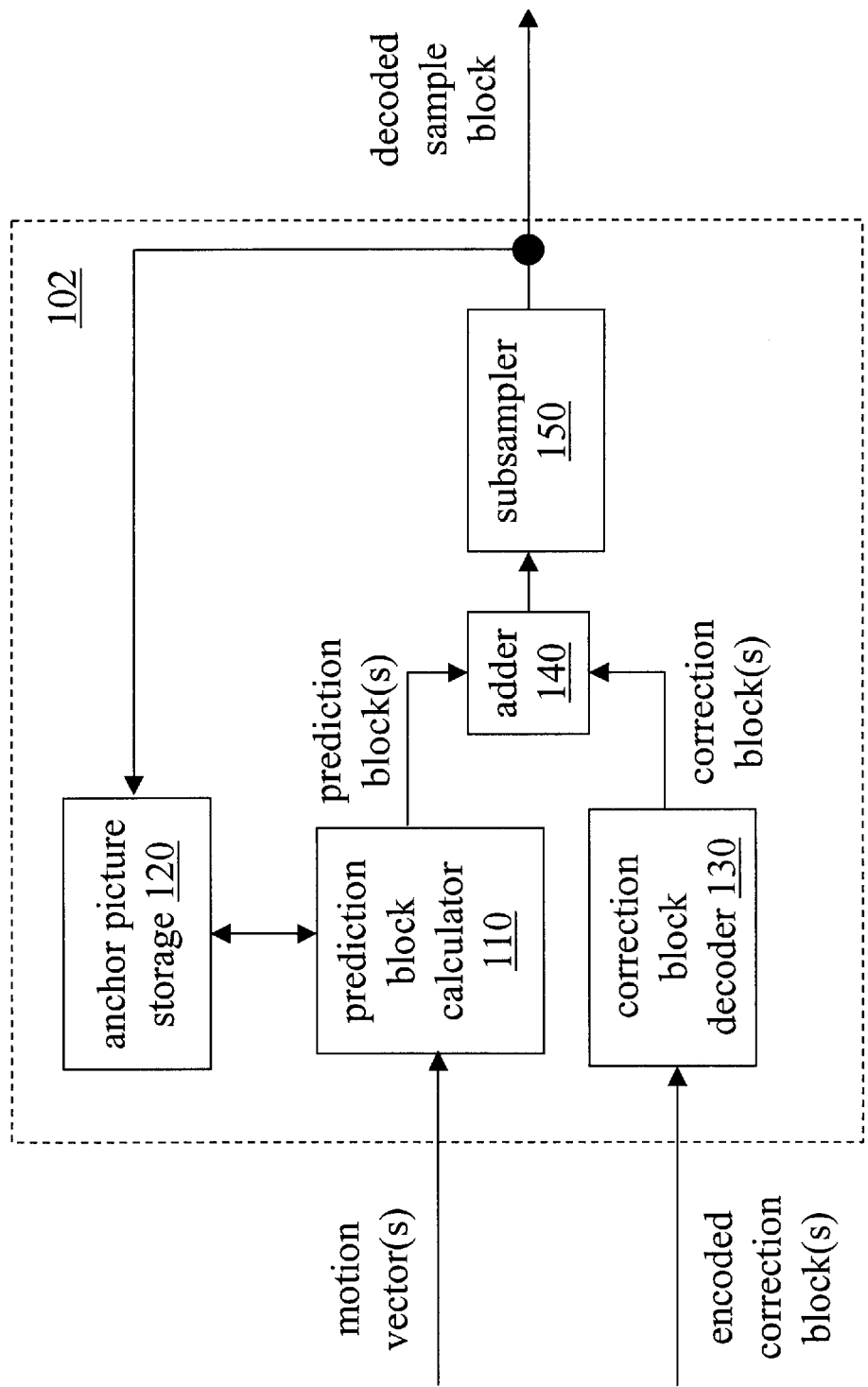
FIG. 7B shows a block diagram for an apparatus according to another embodiment of the invention.

FIG. 7B shows a block diagram for an apparatus 102 according to another embodiment of the invention. In this embodiment, all decoded sample blocks pass through subsampler 150 before output. Such an apparatus may be more practical for decoding an MPEG-2 compliant stream than the apparatus of FIG. 7A, as it reduces the storage requirements for the display stage. Although the output of the apparatus of FIG. 7B is at a lower resolution, an MPEG-2 compliant encoding scheme does not account for subsampling of the information in the anchor picture storage. Therefore, it is possible that little or no actual advantage in display quality would be gained by using the apparatus of FIG. 7A rather than that of FIG. 7B.

As noted above, performing a two-point averaging operation on a block of samples may yield a different subsampled result, depending upon the scanning format of the block (the same may be true of any other interpolation operation). In a particular implementation of an apparatus of FIG. 7A or 7B, samples for each component (e.g., Y, Cb, and Cr) of anchor picture storage 120 conform to a single predetermined subsampling grid (although different grids may be used for different components). This uniformity may be achieved regardless of the scanning format of the received encoded blocks by using a different interpolation operation depending upon the scanning format, for example. In one embodiment, a subsampling grid as shown in FIG. 6A (i.e. nonuniformly spaced in a vertical dimension) is used. Note that for a block of samples that is encoded as two interlaced fields, such a grid may be obtained by applying a simple two-point averaging operation in each dimension as described above.

In an alternate embodiment, a subsampling grid as shown in FIG. 5A (i.e. uniformly spaced in a vertical dimension) is used in anchor picture storage 120. A two-point averaging operation cannot produce such a grid from a block of samples encoded as two interlaced fields, and this embodiment requires an interpolation operation that may be more computationally intensive (e.g. one that weights the samples among its domain differently, rather than the same as in an averaging operation). For example, the 8×8-sample block of FIG. 6A (i.e. scanned as two fields interlaced line-by-line) can be subsampled to a grid that is uniformly spaced in the vertical direction (as shown in FIG. 5B) by applying a 75/25 weighting (or a 25/75 weighting, as appropriate) in the vertical direction rather than a 50/50 weighting as with a two-point average.

Note, however, that a uniformly spaced grid may be more likely to conform to a display space domain than a non-uniformly spaced grid. Therefore, it may be more likely that additional processing would be necessary to display a block subsampled to a non-uniformly spaced grid as shown in FIG. 6A. For a particular application, consequently, it may be advantageous to perform subsampling of all decoded blocks to a uniformly spaced grid in subsampler 150 rather than to perform additional operations at a later stage at which computational and/or storage capacity may be limited.

Figure 8:
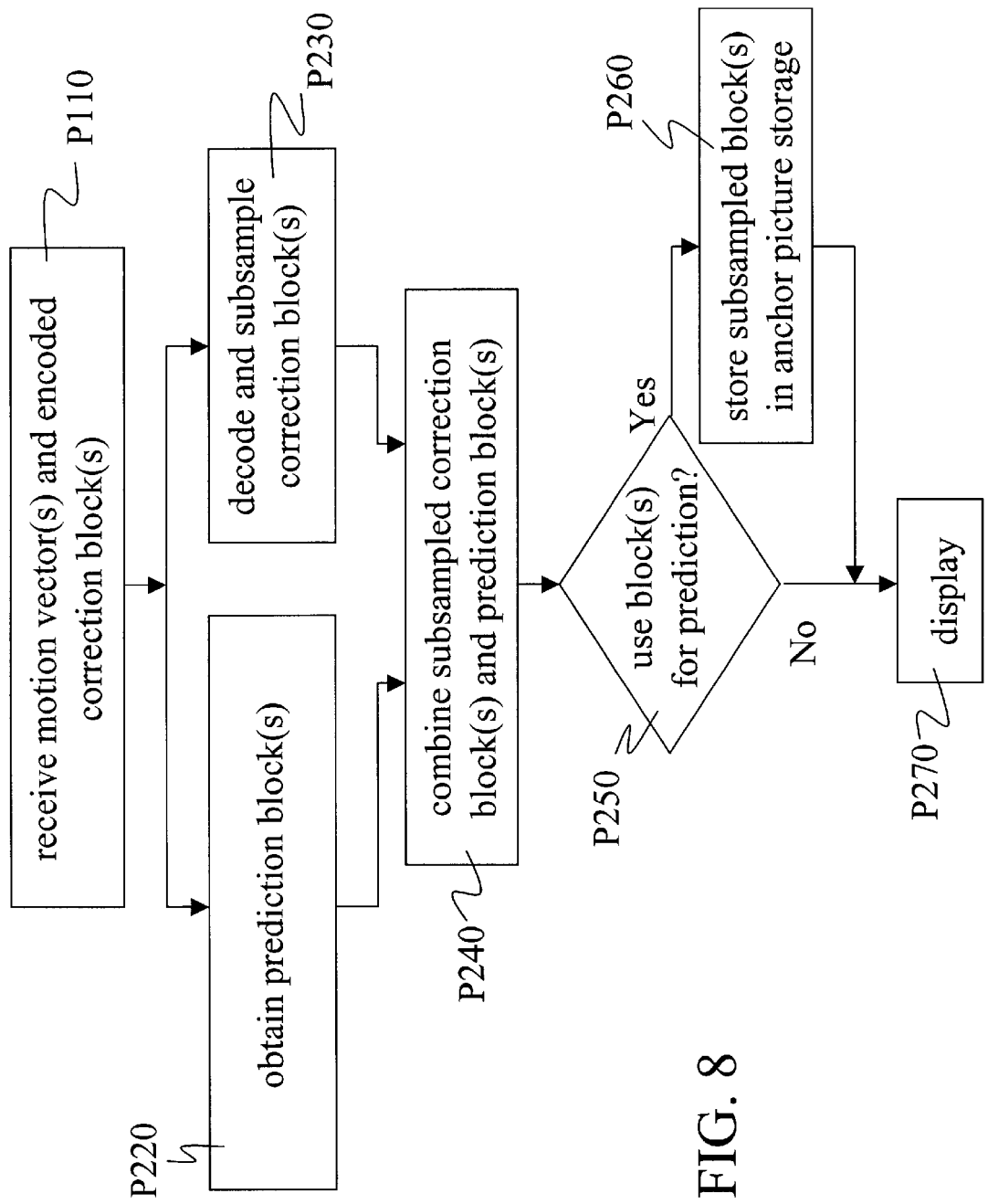
FIG. 8 shows a flow chart for a method according to an embodiment of the invention.
Figure 9:
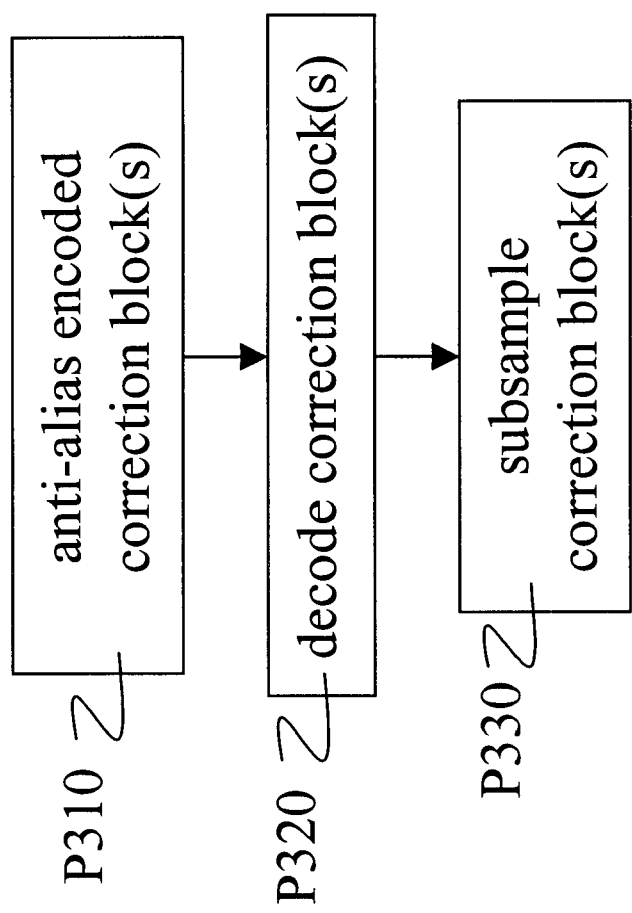
FIG. 9 shows an example of subtasks that may be performed within task P230 of FIG. 8.

FIG. 8 shows a flow chart for a method according to another embodiment of the invention. In task P110, one or more motion vectors and one or more correction blocks are received as described above. In task P230, one or more decoded correction blocks are produced that conform to a different sampling grid than the one or more received encoded correction blocks to which they correspond. In the particular (and non-limiting) implementation presented, an encoded correction block is decoded to a subsampled sampling grid. For a sequence encoded using MPEG-2, for example, task P230 receives an encoded correction block of coefficients in a DCT domain and produces a decoded correction block of samples in a subsampled spatial domain. As shown in FIG. 9, task P230 may include several subtasks, such as:

1) Antialiasing an encoded correction block to remove frequency components that are not supported in the subsampled domain (subtask P310). One way to perform this subtask is to zero out transform coefficients that represent such unsupported frequencies. In an implementation wherein a correction block is to be subsampled by two in both the vertical and horizontal dimensions, for example, an 8×8 block of DCT coefficients may be antialiased by zeroing out all but the 4×4 subblock of coefficients that represent the lowest spatial frequencies. Alternative methods of antialiasing may include applying one or more lowpass filters (e.g. to each field) in the spatial domain or an equivalent operation in the transform domain.

2) Decoding a correction block of coefficients into a block of samples (subtask P320). For a MPEG-compliant implementation, this step may be performed by applying the inverse DCT (IDCT) operation from Annex A of the MPEG-2 specification as referenced above.

3) Subsampling a correction block, e.g. by performing an averaging or interpolation operation in the matrix space domain as discussed above (subtask P330). Note that if linear operations are used to perform these subtasks, the operations may be performed and/or combined in an arbitrary order (subject to roundoff and quantization error). For example, the subtask of subsampling by interpolation in the spatial domain may be performed equivalently (either before or during the decoding operation of subtask P320) as a convolution in the DCT domain.

Figure 10:
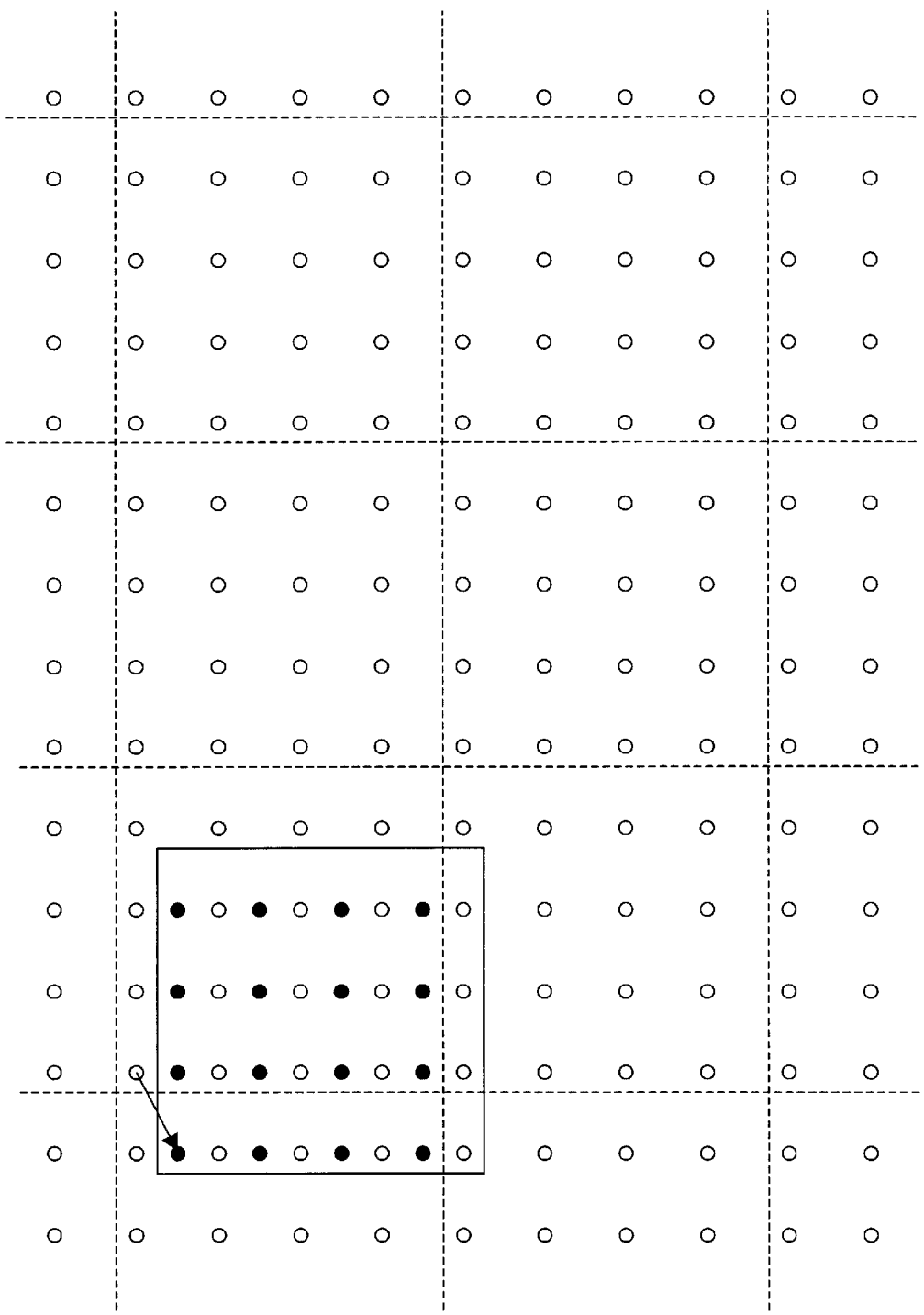
FIG. 10 shows an example of the operation of task P220 of FIG. 8.

In task P220, one or more prediction blocks are obtained (as indicated by one or more motion vectors) which conform to the sampling grid used in task P230 (in this particular implementation, a subsampling grid). The production of a prediction block in task P220 is illustrated in FIG. 10, which figure is analogous to FIG. 4 except that the subsampled prediction block in this example contains only a 4×4-sample block (i.e. only those samples indicated by the filled circles).

Note that practice of the invention does not require the number of samples (or the spacing between samples) to be the same in both the subsampled prediction block domain and the domain of the corresponding portion of the anchor picture storage. In order to simplify the combining operation performed by in task P240, however, it may be advantageous for the sampling grids of the subsampled prediction block(s) and the subsampled correction block(s) to coincide.

If information in the decoded subsampled block may be needed in decoding another sample block (e.g. as determined in task P250 for a block-by-block decision), then the decoded subsampled block is stored in task P260 to the anchor picture storage referenced in task P220. It may be advantageous for the anchor picture storage to conform to the same sampling grid as the decoded subsampled matrix block so that the block may be stored directly without a need for remapping.

Devices used for the display of digital picture information (such as computer or television monitors or screens) commonly use a sampling grid that has uniform spacing between pixels in each dimension (i.e. a grid in which each sample point location is equidistant from adjacent sample point locations). Therefore, it may also be advantageous for the decoded subsampled block to conform to a uniformly spaced subsampling grid (e.g. as shown in FIG. 5A) so that the block may be displayed (event P270) with little or no extra processing.

For example, it may be necessary in any case to combine a decoded block with corresponding blocks from other components (e.g. Y, Cb, Cr) and/or to remap from one color space to another (e.g. from YCbCr to RGB). Such operations may be performed accurately with much less computing power and/or storage requirements, however, than an operation such as remapping a block to a different sampling grid. Because the resources available at the display stage may be limited or unknown, it may be advantageous to use a method as described herein in such a way (e.g. by subsampling to a uniform grid) as to minimize subsequent processing requirements. In a different implementation, event P270 may include interpolation to a different resolution (e.g. a resolution corresponding to the encoded correction block, the display device, or a desired size of the displayed picture).

Figure 11:
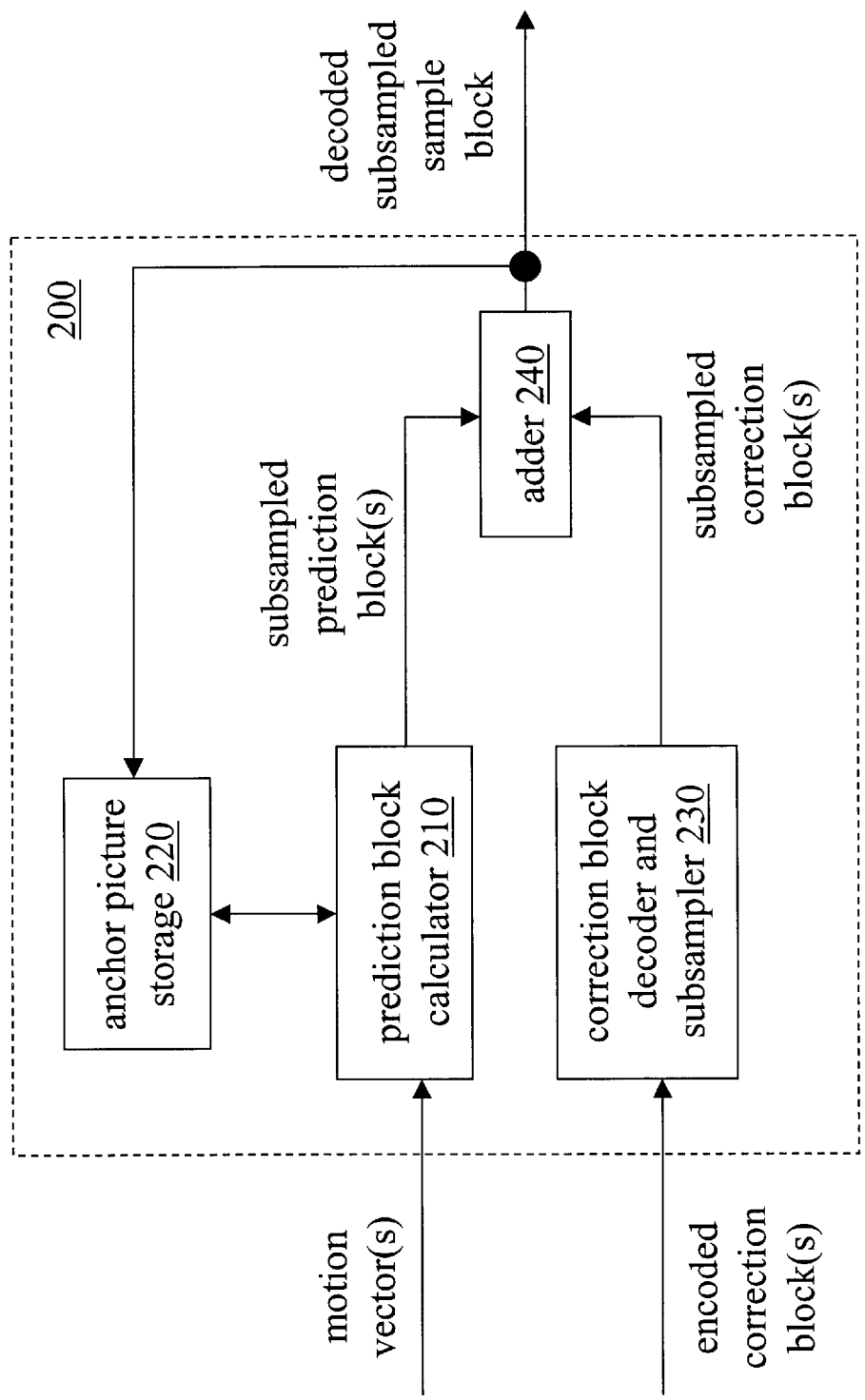
FIG. 11 shows a block diagram for an apparatus according to an embodiment of the invention.

FIG. 11 shows a block diagram for an apparatus 200 according to an embodiment of the invention. Apparatus 200 receives one or more motion vectors and one or more encoded correction blocks as described above and produces a decoded sample block that conforms to a different sampling grid than that of the encoded correction block or blocks that were received (again, in this particular but non-limiting implementation, the decoded block conforms to a subsampled grid). Prediction block calculator 210 receives the motion vector(s) and produces one or more subsampled prediction blocks. Specifically, prediction block calculator 210 applies a motion vector to select a subsampled block of samples from anchor picture storage 120 and operates upon the subsampled block (e.g. as described above with respect to task P220) to produce a subsampled prediction block.

Correction block decoder and subsampler (CBDS) 230 receives, decodes, and subsamples the correction information to obtain one or more subsampled correction blocks (as described above, for example, with respect to task P230). In a particular embodiment, CBDS 230 subsamples by interpolation (or an equivalent operation in a nonspatial domain) such that a subsampled correction block conforms to the sampling grid used for the subsampled prediction block(s). For example, CBDS 230 may use different subsampling operations, depending upon the scanning format of an encoded correction block being processed, in order to produce a subsampled correction block that conforms to a common sampling grid. In one embodiment, the common sampling grid is evenly spaced (e.g. as shown in FIG. 5A).

In an alternate embodiment, the common sampling grid is not evenly spaced (e.g. as shown in FIG. 6A).

In the alternative, it is possible for CBDS 230 to use the same subsampling operation regardless of the scanning format, so that blocks having different scanning formats will be subsampled to different subsampling grids. Such an alternative may require remapping at least some of the decoded subsampled blocks before storage and/or combination for display.

Adder 240 receives the subsampled prediction and correction blocks and combines them to produce a decoded subsampled block of samples. The decoded subsampled block may be used to update at least a portion of anchor picture storage 220 (e.g. to support the derivation of a subsampled prediction block for a sample block to be decoded subsequently). The decoded subsampled block is also outputted by apparatus 200 and may be displayed (after any necessary combination with other blocks and/or operations such as YCbCr-to-RGB mapping).

As noted above, certain advantages may attach to the use in CBDS 230 of a common grid having uniform spacing between samples. In a device supporting a low-resolution display such as a PIP application, for example, a decoded subsampled block that conforms to such a grid may be displayed more easily than one which requires remapping to a different sampling grid, requiring only such operations as a combination with corresponding blocks of other components (e.g. Y, Cb, and Cr) and/or a mapping such as from a YCbCr color space to RGB. These operations may be performed more accurately and less expensively (in terms of required computing power and/or storage) than operations such as remapping of sample values to a different sampling grid.

In an application to a encoding scheme that is not MPEG-2 compliant, a method or apparatus according to an embodiment of the invention may be used to process blocks of pixels rather than blocks of samples. Also note that an embodiment of the invention may also be applied to process blocks from fewer than all of the constituent components (e.g. Y, Cb, and Cr) of a picture.

The foregoing presentation of the described embodiments is provided to enable any person skilled in the art to make or use the present invention. Various modifications to these embodiments are possible, and the generic principles presented herein may be applied to other embodiments as well. For example, the embodiments described above are also compatible with advanced features of motion-compensation encoding schemes (such as those described in the standards referenced herein), including dual prime prediction and bidirectional prediction. Additionally, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

I claim:

1. An apparatus comprising:
    a prediction block calculator to receive a motion vector and to produce a prediction block of samples;
    an adder to combine the prediction block and a correction block of samples and to produce a decoded block of samples,
    wherein said prediction block is based on at least a portion of a stored block of samples, and
    wherein the samples of the stored block correspond to sample points in a first sampling grid, the samples of the prediction block correspond to sample points in a second sampling grid, and the first sampling grid is subsampled in at least a vertical direction with respect to the second sampling grid, and
    wherein the correction block corresponds to at least a portion of a picture comprising a plurality of interlaced fields.

2. The apparatus according to claim 1, wherein the stored block comprises at least a portion of a decoded block of samples already produced by the adder.

3. The apparatus according to claim 1, wherein the correction block is derived at least in part from transform coefficients.

4. The apparatus according to claim 3, wherein the correction block is derived at least in part from discrete cosine transform coefficients.

5. An apparatus comprising:
    a prediction block calculator to receive a motion vector and to produce a prediction block of samples;
    an adder to combine the prediction block and a correction block of samples and to produce a decoded block of samples,
    wherein said prediction block is based on at least a portion of a stored block of samples, and
    wherein the samples of at least one among the prediction block and the correction block correspond to sample points in a first sampling grid, the motion vector corresponds to a second sampling grid, and the first sampling grid is subsampled in at least a vertical direction with respect to the second sampling grid, and
    wherein the correction block is derived from information relating to at least a portion of a picture comprising a plurality of interlaced fields.

6. The apparatus according to claim 5, wherein the samples of the prediction block correspond to sample points in the first sampling grid.

7. The apparatus according to claim 5, said apparatus further comprising a correction block calculator to receive encoded correction block information and output the correction block,
    wherein the correction block calculator performs an anti-aliasing operation on the encoded correction block information.

8. The apparatus according to claim 5, wherein the samples of the stored block correspond to sample points in the first sampling grid.

9. The apparatus according to claim 5, wherein the samples of the decoded block correspond to sample points in the first sampling grid.

10. A method comprising:
    producing a prediction block of samples, said producing being in accordance with at least a motion vector;
    decoding encoded correction block information to produce a correction block of samples; and
    combining the prediction block and the correction block of samples to produce a decoded block of samples,
    wherein the prediction block is based on at least a portion of a stored block of samples, and
    wherein the samples of at least one among the prediction block and the correction block correspond to sample points in a first sampling grid, the encoded correction block information corresponds to a second sampling grid, and the first sampling grid is subsampled in at least a vertical direction with respect to the second sampling grid.

11. The method according to claim 10, wherein the samples of the prediction block correspond to sample points in the first sampling grid.

12. The method according to claim 10, wherein decoding encoded correction block information includes antialiasing the encoded correction block information with respect to a spatial domain.

13. The method of claim 12, wherein antialiasing the encoded correction block information is performed by an operation in a nonspatial domain.

14. A data storage medium having machine-readable code stored thereon, the machine-readable code comprising instructions executable by an array of logic elements, the instructions defining a method comprising:
   producing a prediction block of samples, said producing being in accordance with at least a motion vector;
   decoding encoded correction block information to produce a correction block of samples; and
   combining the prediction block and the correction block of samples to produce a decoded block of samples,
   wherein the prediction block is based on at least a portion of a stored block of samples, and
   wherein the samples of at least one among the prediction block and the correction block correspond to sample points in a first sampling grid, the encoded correction block information corresponds to a second sampling grid, and the first sampling grid is subsampled in at least a vertical direction with respect to the second sampling grid.

15. The medium according to claim 14, wherein the samples of the prediction block correspond to sample points in the first sampling grid.

16. The medium according to claim 14, wherein decoding encoded correction block information includes antialiasing the encoded correction block information with respect to a spatial domain.

17. The medium of claim 16, wherein antialiasing the encoded correction block information is performed by an operation in a nonspatial domain.

18. A system to receive a bitstream comprising a motion vector and encoded correction block information, said system comprising:
   a prediction block calculator to receive a motion vector and to produce a prediction block of samples;
   a correction block calculator to receive encoded correction block information and to produce a correction block of samples;
   an adder to combine the prediction block and the correction block and to produce a decoded block of samples; and
   a display device to display information based at least in part on the decoded block of samples,
   wherein said prediction block is based on at least a portion of a stored block of samples, and
   wherein the samples of at least one among the prediction block and the correction block correspond to sample points in a first sampling grid, the motion vector corresponds to a second sampling grid, and the first sampling grid is subsampled in at least a vertical direction with respect to the second sampling grid, and
   wherein the correction block is derived from information relating to at least a portion of a picture comprising a plurality of interlaced fields.

19. The system according to claim 18, wherein the samples of the prediction block correspond to sample points in the first sampling grid.

20. The system according to claim 18, said apparatus further comprising a correction block calculator to receive encoded correction block information and output the correction block,
   wherein the correction block calculator performs an antialiasing operation on the encoded correction block information.

21. The system according to claim 18, wherein the samples of the stored block correspond to sample points in the first sampling grid.

22. The system according to claim 18, wherein the samples of the decoded block correspond sample points in the first sampling grid.

23. A method comprising:
   receiving a translational offset defined with respect to a first sampling grid;
   receiving correction information defined with respect to the first sampling grid, the correction information defining a plurality of interlaced fields;
   in accordance with the translational offset, retrieving a block of samples;
   decoding the correction information to obtain a correction block of samples; and
   combining the correction block with a prediction block of samples that is based on the retrieved block,
   wherein the samples of the retrieved block correspond to sample points in a second sampling grid, and
   wherein the second sampling grid is subsampled in at least a vertical direction with respect to the first sampling grid.

24. The method according to claim 23, wherein said receiving a translational offset comprises receiving a translational offset defined with respect to a first sampling grid that is uniform in each of two orthogonal directions.

25. The method according to claim 23, wherein the samples of the correction block correspond to sample points in the first sampling grid.

26. The method according to claim 23, wherein the samples of the correction block correspond to sample points in the second sampling grid.

27. The method according to claim 23, wherein the correction information includes transform coefficients.

28. The method according to claim 23, wherein the correction information includes discrete cosine transform coefficients.

29. An apparatus comprising a data storage medium having machine-readable code stored thereon, the machine-readable code comprising instructions executable by an array of logic elements, the instructions defining a method including:
   receiving a translational offset defined with respect to a first sampling grid;
   receiving correction information defined with respect to the first sampling grid, the correction information defining a plurality of interlaced fields;
   in accordance with the translational offset, retrieving a block of samples;
   decoding the correction information to obtain a correction block of samples; and
   combining the correction block with a prediction block of samples that is based on the retrieved block,
   wherein the samples of the retrieved block correspond to sample points in a second sampling grid, and wherein the second sampling grid is subsampled in at least a vertical direction with respect to the first sampling grid.

30. The apparatus according to claim 29, wherein the samples of the correction block correspond to sample points in the first sampling grid.

31. The method according to claim 29, wherein the samples of the correction block correspond to sample points in the second sampling grid.

32. The apparatus according to claim 1, wherein adjacent sample points in the first sampling grid are uniformly spaced along the vertical direction.

33. The apparatus according to claim 1, wherein the first sampling grid is subsampled in a horizontal direction with respect to the second sampling grid.

34. The apparatus according to claim 33, wherein adjacent sample points in the first sampling grid are uniformly spaced along the horizontal direction.

35. The apparatus according to claim 10, wherein adjacent sample points in the first sampling grid are uniformly spaced along the vertical direction.

36. The apparatus according to claim 10, wherein the first sampling grid is subsampled in a horizontal direction with respect to the second sampling grid.

37. The apparatus according to claim 36, wherein adjacent sample points in the first sampling grid are uniformly spaced along the horizontal direction.

* * * * *